United States Patent [19]

Sieminski, Jr. et al.

[11] Patent Number: 5,655,156
[45] Date of Patent: Aug. 5, 1997

[54] APPARATUS AND METHOD FOR CLOSING A CAMERA BODY

[75] Inventors: John Sieminski, Jr.; David Louis Traino, both of Rochester, N.Y.

[73] Assignee: Eastman Kodak Company, Rochester, N.Y.

[21] Appl. No.: 723,445

[22] Filed: Oct. 7, 1996

[51] Int. Cl.⁶ .......................... G03B 17/02; G03B 29/00
[52] U.S. Cl. .................. 396/6; 396/429; 396/535; 396/661
[58] Field of Search .................. 396/6, 429, 535, 396/661; 225/91, 92; 414/412

[56] References Cited

U.S. PATENT DOCUMENTS

| | | | |
|---|---|---|---|
| 1,903,097 | 3/1933 | Dunford et al. | 30/124 |
| 3,328,876 | 7/1967 | Hoppe | 30/124 |
| 3,827,588 | 8/1974 | Gnage et al. | 414/412 |
| 4,497,113 | 2/1985 | Haws | 30/124 |
| 4,833,495 | 5/1989 | Ohmura et al. | 354/212 |
| 5,126,775 | 6/1992 | Nakai et al. | 396/6 |
| 5,285,229 | 2/1994 | Kamata | 396/6 |
| 5,349,410 | 9/1994 | Kamata | 396/6 |
| 5,452,513 | 9/1995 | Zinnbauer et al. | 30/140 |
| 5,530,507 | 6/1996 | Boyd | 396/6 |
| 5,581,321 | 12/1996 | Boyd | 396/535 |

FOREIGN PATENT DOCUMENTS

| | | | |
|---|---|---|---|
| 0 596 509 | 5/1994 | European Pat. Off. | G03B 17/02 |
| 598393 | 5/1994 | European Pat. Off. | G03B 17/04 |
| 704760 | 4/1996 | European Pat. Off. | G03B 13/00 |
| 7-134371 | 5/1995 | Japan | B03C 3/00 |
| 7-244358 | 9/1995 | Japan | G03C 3/00 |

*Primary Examiner*—A. A. Mathews
*Attorney, Agent, or Firm*—Charles E. Snee, III

[57] ABSTRACT

Apparatus is disclosed for closing a camera body of a type including a housing (10) for internal camera components, the housing including a cover part (12) and another part (14); and a plurality of fastener pairs (54, 56; 60, 62) extending between said parts, each fastener pair including a hook (54, 56) and a catch (60, 62) including an opening (64) for engaging a tip (56') of the hook. The apparatus may include a frame 162); a gripper (166–186) supported by the frame, the gripper having a pair of tines (170, 172) separated by a slot (174) for receiving the tip of the hook, a least one of the tines being configured (176–186) to engage an edge of the opening during insertion of the gripper into the opening, whereby said at least one tine is caused to flex into contact with the tip of the hook to grip the tip between said tines; and a cutter (188–192) supported by the frame, said the having a cutting edge (190) extended across the slot for severing the tip from the hook. A method of use also is taught.

10 Claims, 5 Drawing Sheets

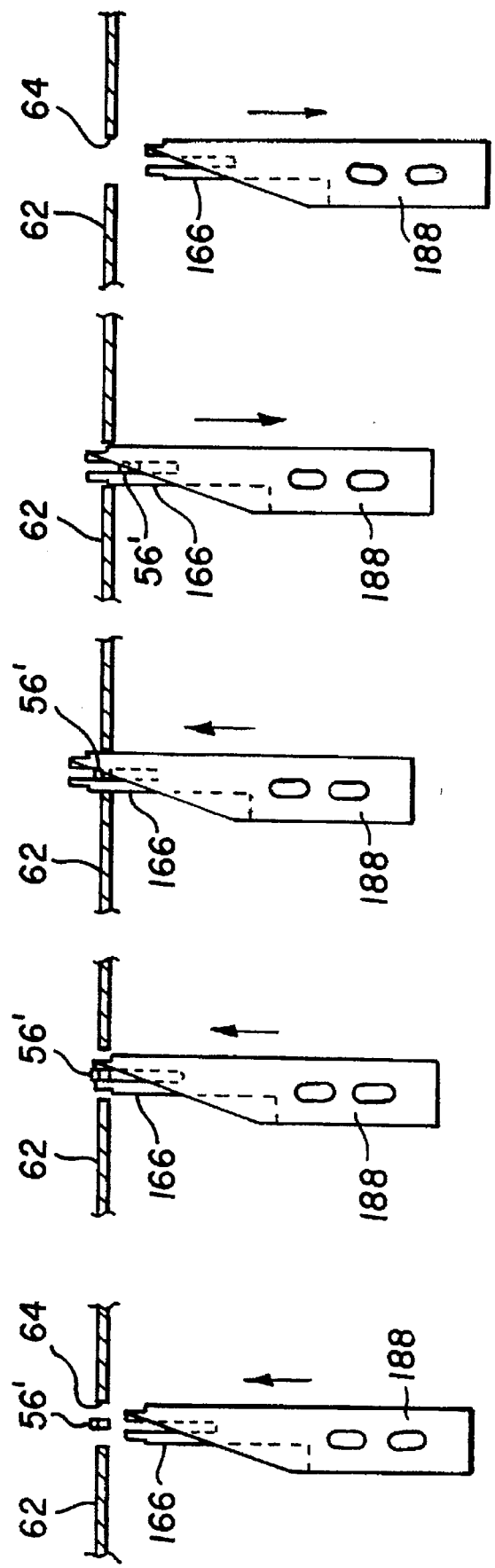

APPARATUS AND METHOD FOR CLOSING A CAMERA BODY

DESCRIPTION

1. Technical Field

The invention concerns apparatus and methods for assembling cameras. More particularly, the invention concerns such apparatus and methods for closing a camera body of a single-use camera.

2. Background of the Invention

In recent years, so-called single use or disposable cameras have become popular. Such cameras include an internal frame for supporting conventional camera components, plus a film cartridge and a spool located on opposite sides of an exposure gate for the camera. Prior to use, the unexposed film is wound from the cartridge onto the spool. During use, each exposed frame is wound back into the cartridge. When all of the film has been exposed, the camera is taken to a photographic processor, where the camera housing is opened and the cartridge is removed. The remainder of the camera is then returned to the manufacturer for recovery of reusable components.

FIG. 1 shows an exploded view of a camera housing 10 used for some types of single use cameras. Housing 10 is disclosed in copending, allowed, commonly assigned U.S. application Ser. No. 08/327,250 filed Oct. 21, 1994 by James D. Boyd, now U.S. Pat. No. 5,581,321, the contents of which are incorporated by reference into this application. Housing 10 comprises a front cover part 12 and a back cover part 14 which in an assembled camera enclose an internal camera frame on which the functional components of the camera are mounted, not illustrated. Thus, cover part 12 includes an opening 16 for a taking lens, an opening 18 for a viewfinder, an opening 20 for a flash unit, and an integral flash activation button 22. A more compact camera also is made without the flash unit and flash activation button. When the cover parts are assembled about the internal camera components, mating partial openings 24$_f$ and 24$_b$ cooperate to provide an opening for a shutter trigger button; and mating partial openings 26$_f$ and 26$_b$ cooperate to provide an opening for a window to view a frame counterwheel. In an assembled camera, a trio of positioning pins 28, 30, 32 extended from back cover part 14 mate with a corresponding set of bores, not illustrated, in front cover part 12.

As seen in FIG. 1, front cover part 12 includes a top wall 34, a bottom wall 36, a left end wall 38, and a right end wall 40. Similarly, back cover part 14 includes a top wall 42, a bottom wall 44, a left end wall 46, and a right end wall 48. In the illustrated camera housing, cooperating fastener pairs are included between the respective top, bottom and end walls, to securely join the front and back cover parts and thereby prevent inadvertent opening of the camera and exposure of film. However, those skilled in the art will appreciate that, for suitably rigid front and back cover parts, cooperating fastener pairs could be provided only between the respective end walls, which typically are opened by the photographic processor.

First and second cooperating fastener pairs extend, respectively, between top walls 34, 42 and bottom walls 36, 44. An essentially rectangular opening 50 is provided through top wall 42 and a similar opening 52 is provided through bottom wall 44. Flexible fastener hooks 54, 56 extend into openings 50, 52, respectively. In an outer surface of top wall 42, a recess 58 is formed behind fastener hook 54. An essentially identical recess, not illustrated, is formed in an outside surface of bottom wall 44 behind fastener hook 56. Opposite opening 50 and hook 54 and opposite opening 52 and hook 56, top wall 34 and bottom wall 36 support, respectively, a pair of flexible catch tabs 60, 62, the latter being fragmentarily visible through opening 16. Each of catch tabs 60, 62 includes an opening 64 for receiving one of hooks 54, 56 when the cover parts are assembled. Each of catch tabs 60, 62 also includes an outwardly extended lip 66 which fits into recess 58 when the cover parts are assembled. An elongated recess 68 is formed in each of top wall 34 and bottom wall 36 in front of opening 64. Alternatively, the fastener hooks could be on front cover part 12 and the catch tabs could be on rear cover part 14.

Third and fourth cooperating fastener pairs extend, respectively, between left end walls 38, 46 and right end walls 40, 48. Each of end walls 38, 40 includes a recess 70 in which a pair of vertically spaced catches 72, 74 are located. Opposite recesses 70, end walls 46, 48 support, respectively, a pair of flexible catch tabs 75, 76. Each of the catch tabs includes a pair of vertically spaced openings 77, 78 for receiving catches 72, 74 when the cover parts are assembled. Catch tabs 75, 76 also include respective tapered lips 80, 82 which extend into recesses 70 when the cover parts are assembled. Alternatively, the catches could be on back cover part 14 and the catch tabs could be on front cover part 12.

To assemble a camera using cover parts 12, 14, the internal components of the camera, not illustrated, are assembled and captured between front and back cover parts 12, 14. As the cover parts are brought together, positioning pins 28, 30, 32 enter the bores in cover part 12 to pilot the cover parts into proper mating engagement. As the pins enter their associated bores, fastener hooks 54, 56 flex to ride under catch tabs 60, 62 and eventually tips 56' of the hooks snap outward into engagement with openings 64. See FIG. 2, which shows a bottom view of a fully assembled camera having the front and back cover parts shown in FIG. 1. Fastener hooks 54, 56 then may be ultrasonically or thermally welded to catch tabs 60, 62, to provide further assurance that the consumer will not be able to open the camera. Or the tips of the hooks may be omitted and the arms of the hooks welded to the catch tabs. In either event, the resultant, welded fastener pairs can be released by inserting a cutting tool between recess 58 and lip 66 to cut the welded bond between the two, or by inserting a cutting tool along recess 68 to engage and cut the welded bond.

Essentially simultaneously with engagement of fastener hooks 54, 56 and catch tabs 60, 62, catch tabs 75, 76 flex to ride over catches 72, 74 and eventually the catch tabs snap inward over the catches. However, catch tabs 75, 76 and catches 72, 74 are left in mechanical engagement, rather than being welded, to facilitate their being opened by a photographic processor after all the film has been exposed. These fastener pairs can be opened by inserting a prying tool between lips 80, 82 and recess 70 to flex catch tabs 75, 76 out of engagement with catches 72, 74. Though this feature is not illustrated, the right and left ends of back cover part 14 can then be pivoted away from the back of the camera about lines of weakness in a back wall of the back cover part, not illustrated, to permit removal of the enclosed film cartridge and a battery for the flash unit.

Commonly, the processor will then re-engage the fastener pairs 72, 74; 75, 76 and return the camera to its original manufacturer for removal of reusable internal components. Removal of such internal components requires that fastener hooks 54, 56 be released from catch tabs 60, 62 to permit separation of cover parts 12, 14. Since opening the camera for removal of the battery and film cartridge will weaken the back cover along the lines of weakness previously mentioned and since even the front cover may have been marred in use, the original manufacturer commonly will discard the front and back covers and reuse only certain internal components. Although most such cameras are returned to their original manufacturers, a considerable number are acquired by unauthorized organizations which reload the camera with film, apply different labels and packaging, and then resell the cameras. By carefully releasing fastener hooks 54, 56 from catch tabs 60, 62 and catches 72, 74 from catch tabs 75, 76, the unauthorized reloader can salvage many of the front and back cover parts for reuse.

A need thus has developed for an improved apparatus and method for assembling the front and back cover parts in such a way as to prevent or at least discourage such unauthorized reuse of the cameras, such as by rendering the fastener hooks useless after the cover parts have been assembled. The improved apparatus and method preferably should allow for complete assembly and test of the camera before the fastener hooks are disabled.

SUMMARY OF THE INVENTION

The primary objective of the invention is to provide apparatus and a method for assembling a single-use camera body, which makes difficult an unauthorized reuse of the cover parts.

A further objective is to provide such apparatus and method which are used after a camera has been completely assembled and tested successfully; so that, cameras which have not passed their tests can be readily disassembled for repair.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

The apparatus of the invention is useful for closing a camera body of a type including a housing for internal camera components, the housing including a cover part and another part; and a plurality of fastener pairs extending between the parts, each fastener pair including a hook and a catch including an opening for engaging a tip of the hook. To this end, the apparatus may include a frame and gripper supported by the frame. The gripper may include a pair of tines separated by a slot for receiving the tip of the hook, a least one of the tines being configured to engage an edge of the opening during insertion of the gripper into the opening. As a result, at least one line is caused to flex into contact with the tip of the hook to grip the tip between the tines. A cutter also is supported by the frame, the cutter having a cutting edge extended across the slot for severing the tip from the hook as the gripper is inserted into the opening. Preferably, the gripper and cutter are fixedly supported by the frame.

The apparatus also may include a nest for holding a camera comprising the housing; and means for moving the frame to engage the gripper with the tip of the hook and to force the cutter to sever the tip. Upon withdrawal of the gripper from the opening after the severing, the line flexes out of contact with the severed tip, so that the severed tip drops into a device for collecting the severed tip, such as a vacuum receiver. The apparatus also may include means for welding the hook to the catch adjacent the tip; and means for moving the nest from a first position in which the hook can be engaged by the means for welding, to a second position in which the tip can be engaged by the gripper and the tip can be severed by the cutter. In one embodiment, both of the tines are configured to engage an edge of the opening during insertion of the gripper into the opening, whereby both of the tines are caused to flex into contact with the tip of the hook to grip the tip between the tines.

The method of the invention is useful for closing the same type of camera body and may include steps of closing the cover part and the other part to form the housing, whereby tips of the hooks engage the openings of the catches; welding the hooks to the catches; and severing the tips from the hooks. The method may include a step of gripping the tips prior to the severing step.

The invention provides various advantages. The tips of the hooks are severed, thus making more difficult an unauthorized reloading of a camera. The severed tips are gripped and vacuumed away, thus preventing them from entering the camera body and potentially interfering with operation of the camera. Welding of the hooks and severing of the tips of the hooks can be incorporated into an automated camera assembly system. By completing the welding and severing near the end of the assembly of a camera, defective cameras can be identified prior to welding and cutting; so that, the covers of defective cameras can be readily removed to facilitate repair.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIGS. 5A to 5E are schematic views of the tool of FIG. 4 in sequential stages of use to cut a tip from a fastener hook, taken along line 5—5 of FIG. 2.

DESCRIPTION OF THE PREFERRED EMBODIMENTS

Figure 1:
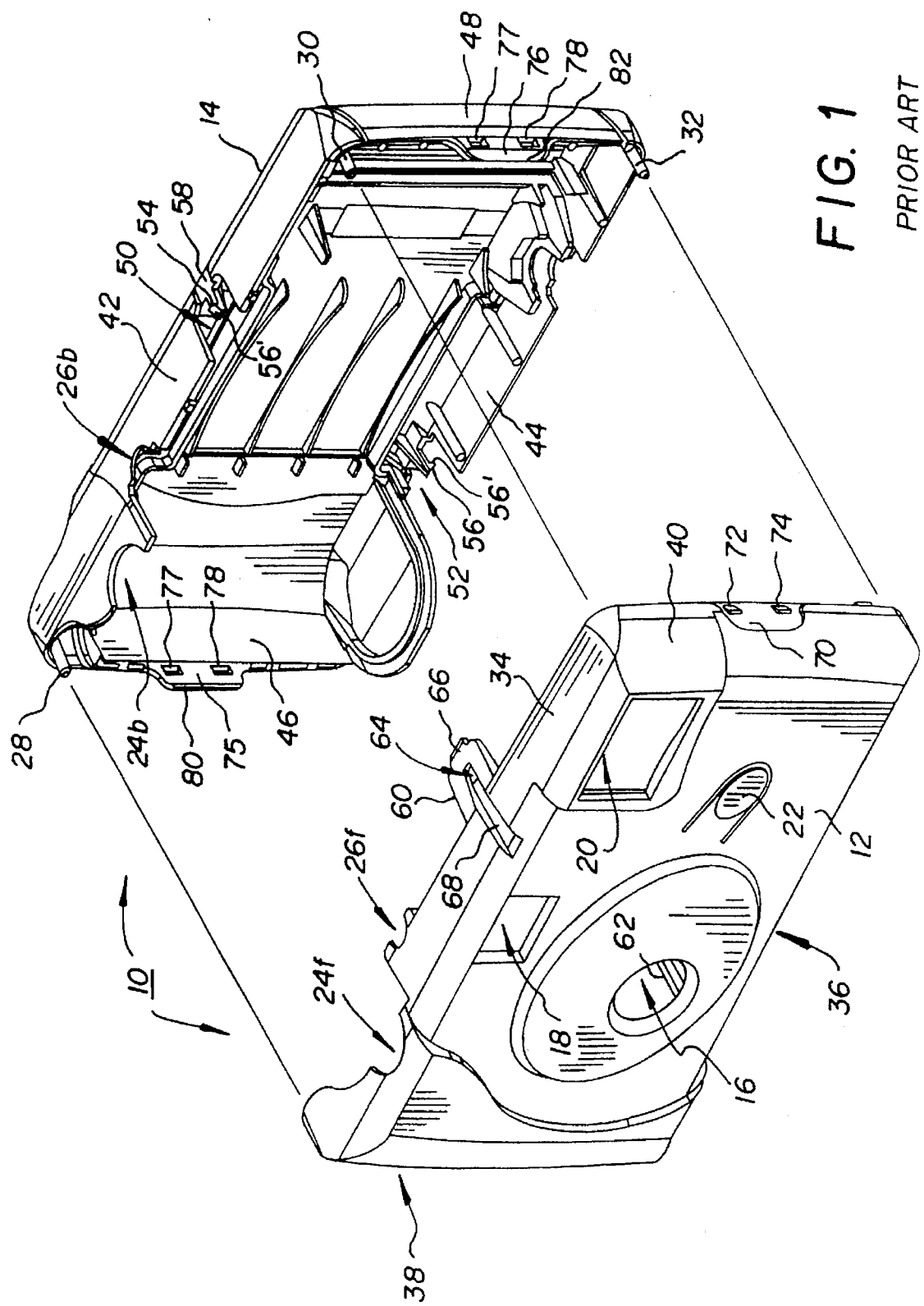
FIG. 1 is a perspective, exploded view of front and back cover parts of a known type of single-use camera.
Figure 2:
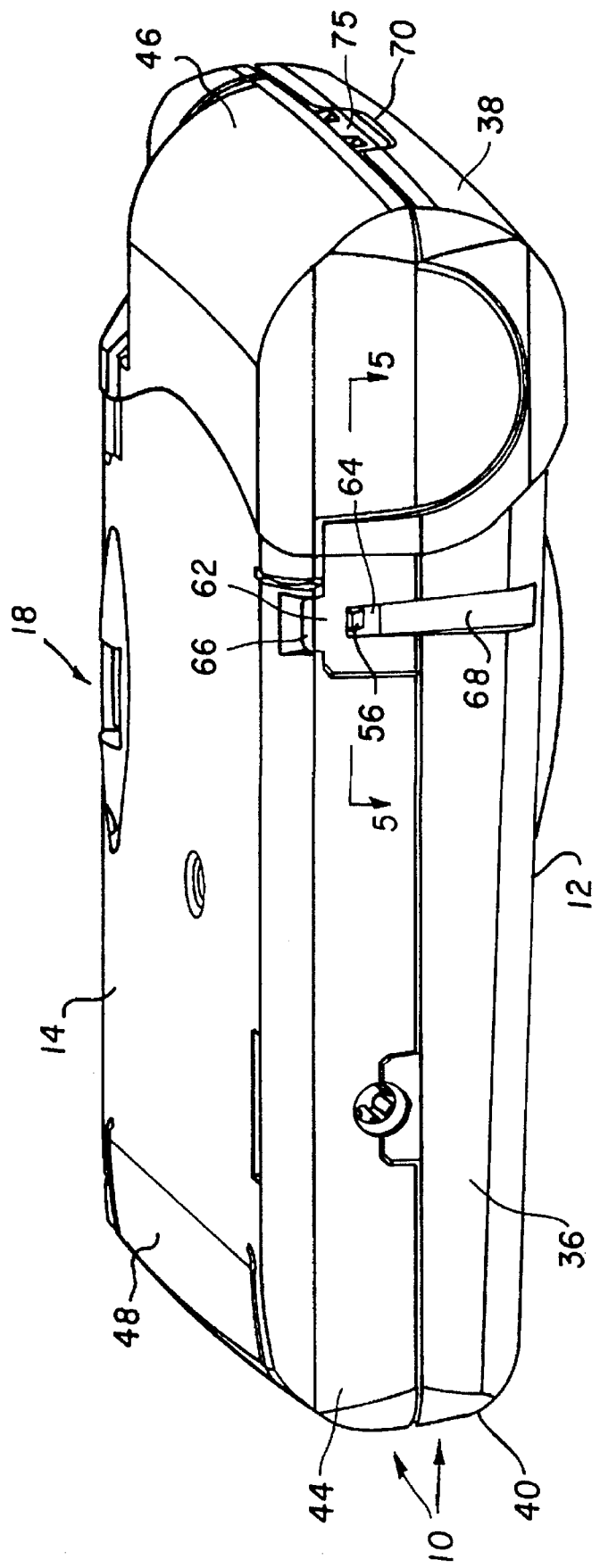
FIG. 2 is a perspective, bottom view of an assembled camera including the cover parts of FIG. 1.

The following is a detailed description of the preferred embodiments of the invention, reference being made to the drawings in which the same reference numerals identify the same elements of structure in each of the several Figures.

Figure 3:
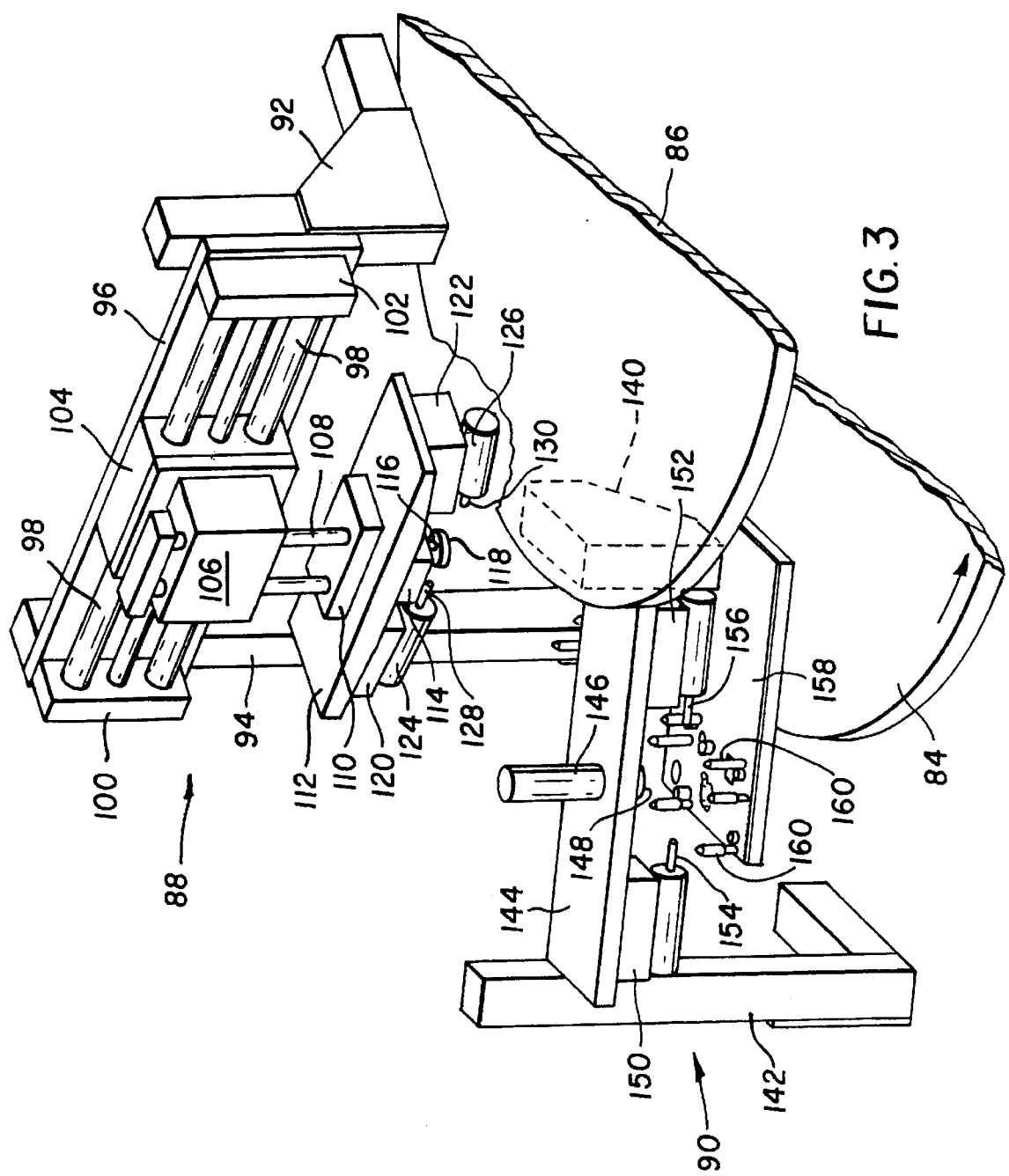
FIG. 3 is a perspective, partially broken away view of an apparatus according to the invention.

FIG. 3 illustrates an apparatus according to the invention. A rotary dial 84 is positioned beneath a fixed frame disk 86. A welding station 88 and a tip gripping and severing station 90 are spaced circumferentially around dial 88. Welding station 88 includes an L-shaped frame member 92 fixedly supported on an upper surface of frame disk 90. Outside dial 88, a further frame member 94 is fixedly positioned. Between frame members 92, 94, a radially extended support plate 96 is mounted. A pair of horizontal guide rails 98 is mounted between a pair of end blocks 100, 102 supported by plate 96. A slider 104 is movably mounted on rails 98 for movement radially toward or away from frame disk 90. Conventional means, such as an air cylinder, may be provided for moving slider 104. Supported by slider 104 is a conventional linear actuator assembly 106 having a pair of vertical actuator rods 108 which support a foot plate 110.

Beneath the foot plate is attached a welder support plate 112. On the under side of support plate 112 is attached a linear actuator assembly 114 having a vertical actuator rod 116 which supports a holding pad 118 for engaging a camera in a manner to be described later in this specification. Arranged on either side of actuator assembly 114 are a pair of linear actuator assebies 120, 122 which may be horizontal or angled downward, as illustrated. Mounted for movement by assemblies 120, 122 are a pair of conventional ultrasonic welding units 124, 126 having horns or probes 128, 130 which can be brought into contact with tabs 60, 62 to weld the tabs to hooks 54, 56, just behind the tips 56' of the hooks.

Gripping and severing station 90 includes a frame member 140, shown primarily in phantom lines in FIG. 3, mounted on the under side of frame disk 86. Outside dial 88, a further L-shaped frame member 142 is fixedly positioned. Between frame members 140, 142 a radially extended support plate 144 is mounted. Centrally mounted on support plate 144 is an essentially vertical linear actuator assembly 146 having an actuator rod, not visible in FIG. 3, which supports a holding pad 148 for engaging a camera in a manner to be described later in this specification. Arranged on either side of actuator assembly 146 on the under side of plate 144 are a pair of essentially horizontal linear actuator assemblies 150, 152. Mounted for movement by assemblies 150, 152 are a pair of gripping and severing tools 154, 156 of the type shown in FIGS. 4 and 5A to 5E. Tools 154, 156 can be brought into engagement with hooks 54, 56 and tabs 60,62 to grip and sever tips 56'.

Dial 84 supports a plurality of radially extended, horizontal nest plates 158, only one of which is visible in FIG. 3. Typically, there would be a number of nest plates corresponding to a number of camera assembly stations situated around dial 84, as will be understood by those skilled in the camera manufacturing technologies. Extended upward from each nest plate are a plurality of positioning pins 160 which secure a camera against movement horizontally when the camera is set face down on the plate and engaged by one of holding pads 118, 148. The pins are spaced sufficiently to allow for passage of welding units 124, 126 and tools 154, 156.

Figure 4:
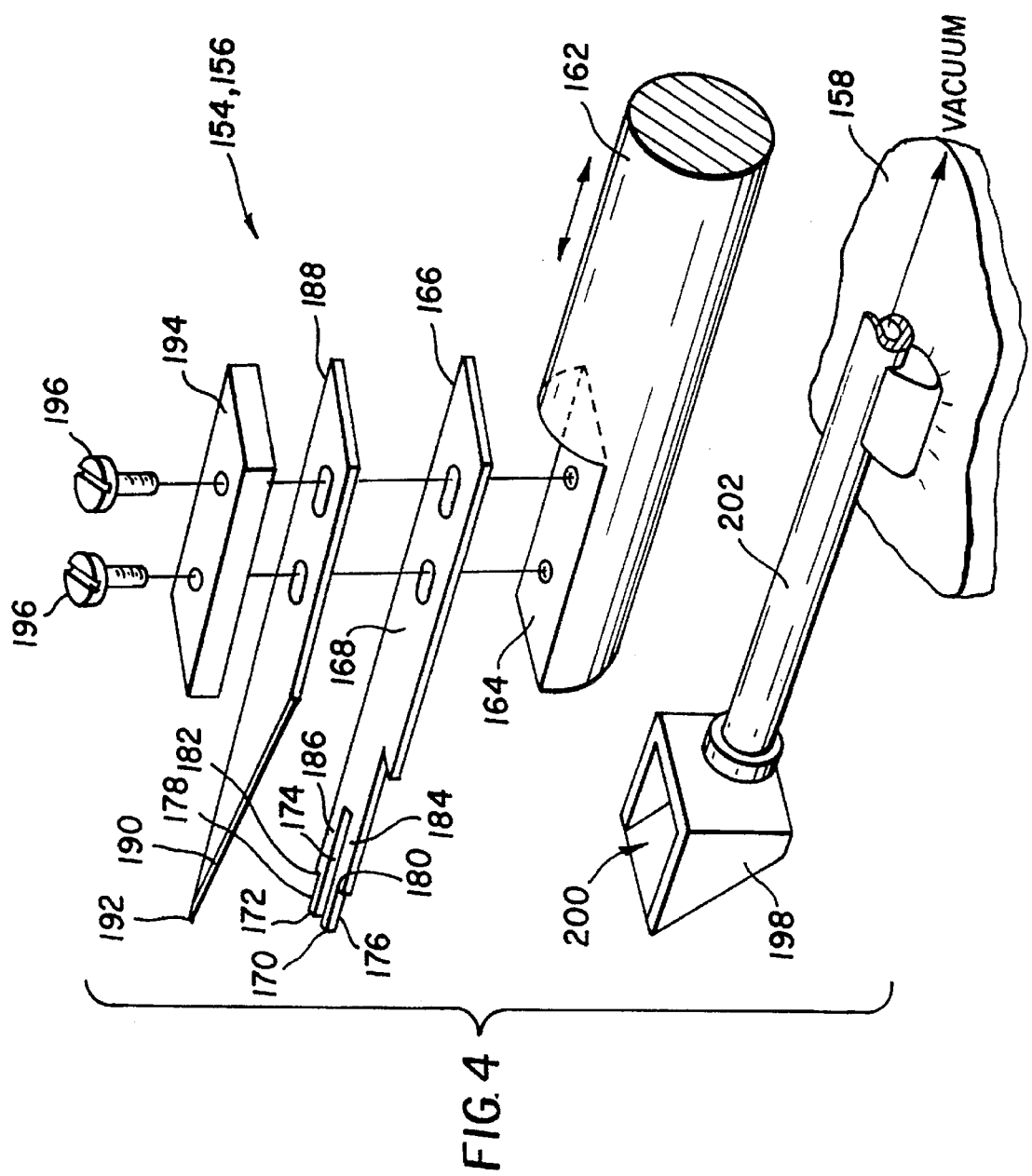
FIG. 4 is a perspective, exploded view of a tool according to the invention for cutting tips from fastener hooks.

FIG. 4 illustrates the details of an embodiment of tools 154, 156. A frame rod 162 includes at one end a flat mounting surface 164. A gripper 166 is supported by mounting surface 164. The gripper comprises a plate-like body portion 168 from which extend a pair of flexible tines 170, 172. Gripper 166 may be made from any suitably flexible material such as metal or plastic; however, Delrin plastic, made by The Polymer Corporation of Reading, Pa., has been found acceptable. The tines are separated by an elongated slot 174 having a width slightly larger than that of tip 56', when the tines have not been flexed toward one another. At their free ends, the tines comprise narrow lead-in portions 176, 178 sized to enable them to slip into opening 64 on either side of tip 56'. At the bases of portions 176, 178, radiused corners 180, 182 lead outward to wider engagement portions 184, 186, whose outer edges are spaced at a distance slightly larger than the width of opening 64, when the tines have not been flexed toward each other. Thus, as will be discussed further with regard to FIGS. 5A to 5E, when gripper 166 is inserted into opening 164, lead-in portions 176, 178 will slip past tip 56'. One or both of the edges of opening 64 will then engage respective radiused corners 180, 182. Further insertion will force engagement portions 184, 186 into contact with the edges of opening 64. Because the outer edges of portions 184, 186 prior to insertion are further apart than the edges of opening 64, tines 170, 172 are forced to flex inwardly into gripping engagement with tip 56'.

A cutter 188 is mounted against gripper 166. The cutter includes an angled cutting edge 190, which extends across slot 174 and terminates at a tip 192 essentially at the tip of tine 172. The angle of cutting edge 190 is selected so that, when cutter 188 is inserted into opening 64, the cutter will engage and begin to sever tip 56' from hook 54, 56, essentially simultaneously with flexing of tines 170, 172 into gripping engagement with tip 56'. A keeper plate 194 secures the gripper and cutter to frame rod 162 by means of a pair of fasteners, such as screws 196, which extend through suitable elongated openings in plate 194, cutter 188, and gripper 166. The assembled parts of FIG. 4 thus comprise gripping and cutting tool 154, 156 supported on linear actuator 150, 152.

Fixedly mounted on nest plate 158 just below tool 154, 156 is a vacuum receiver or bowl 198 having an upwardly open mouth 200. A conduit 202 connects the interior of receiver 198 to a suitable vacuum source, not illustrated. Mouth 200 is located so that a severed tip 56' will drop into the mouth when tool 154, 156 is withdrawn from engagement with a camera.

In operation of the apparatus of FIGS. 3 to 5, a camera first is assembled and tested at stations, not illustrated, positioned upstream of welding station 88 around dial 84. Such upstream stations may include, for example, a station for closing end catches 72–82; a station for pressing housing parts 12, 14 into firm engagement with pins 28–32 fully seated; a station for checking a flash unit on the camera and a flash-ready light; a station for prewinding the film from a cartridge to a spool on an opposite side of the camera; a station for marking cameras which did not properly prewind; and a station for again checking the flash unit and flash-ready light. If the camera passes predetermined standards for all the assembly operations and tests, dial 84 will be stopped first at welding station 88 for welding of the hooks to the catches; and then at station 90 for gripping and severing of the tips of the hooks. If the camera has not passed the tests, stations 88, 90 will be skipped and the camera will be removed for repair, without its hooks and catches having been welded.

When a camera reaches welding station 88, actuator assembly 106 lowers foot plate 110 until welding units 124, 126 are positioned opposite their respective hooks 54, 56 and catch tabs 60, 62. Actuator assembly 114 then lowers pad 118 into contact with the camera. Actuator assemblies 120, 122 then advance welding probes 128, 130 into contact with tabs 60, 62. The welders are then activated to weld the hooks to the tabs just behind tips 56'. The welders and holding pad are then withdrawn to allow dial 84 to move the camera to station 90.

At gripping and severing station 90, actuator assembly 146 lowers pad 148 into contact with the camera. Actuator assemblies 150, 152 then advance gripping and severing tools 154, 156 toward openings 64, as shown in FIG. 5A. When tines 170, 172 first enter openings 64, lead-in portions 176, 178 pass on either side of tip 56', as shown in FIG. 5B. Further insertion engages one or both of portions 184, 186 with the side edge(s) of opening 64, thereby flexing the tines into gripping contact with tip 56', as shown in FIG. 5C. At essentially the same time as the tip is being gripped, edge 190 is cutting through hook 54, 56, just behind the tip. Then, when tools 154, 156 are moved away from openings 64, portions 184, 186 eventually move out of contact with the edges of opening 64, as shown in FIG. 5D; so that, the tip is released from slot 174 while lead-in portions 176, 178 are withdrawn from opening 64. The severed tip is released and falls into receiver 198 to be drawn away by suction applied to conduit 202. Then the tools are withdrawn fully to the position of FIG. 5E.

| Parts List | |
|---|---|
| 10 | camera housing |
| 12 | front cover part |
| 14 | back cover part |
| 16 | opening for taking lens |
| 18 | opening for viewfinder |
| 20 | opening for flash unit |
| 22 | integral flash activation button |
| 24$_f$, 24$_b$ | opening for shutter trigger button |
| 26$_f$, 26$_b$ | opening for viewing window for counterwheel |
| 28, 30, 32 | positioning pins |
| 34 | top wall of 12 |
| 36 | bottom wall of 12 |
| 38 | left end wall of 12 |
| 40 | right end wall of 12 |
| 42 | top wall of 14 |
| 44 | bottom wall of 14 |
| 46 | left end wall of 14 |
| 48 | right end wall of 14 |
| 50 | opening in 42 |
| 52 | opening in 44 |
| 54, 56 | flexible fastener hooks |
| 56' | tip of fastener hook |
| 58 | recess in 42 behind 54 |
| 60, 62 | flexible catch tabs |
| 64 | opening to receive 56' |
| 66 | lip to fit into 58 |
| 68 | elongated recess in 34 in front of 64 |
| 70 | recess in 40 |
| 72, 74 | catches |
| 75, 76 | flexible catch tabs |
| 77, 78 | openings to receive 72, 74 |
| 80, 82 | tapered lips on 75, 76 |
| 84 | rotary dial |
| 86 | fixed frame disk |
| 88 | welding station |
| 90 | tip gripping and severing station |
| 92 | frame member |
| 94 | frame member |
| 96 | radially extended support plate |
| 98 | horizontal guide rods |
| 100, 102 | end blocks |
| 104 | slider |
| 106 | linear actuator assembly |
| 108 | vertical actuator rod |
| 110 | foot plate |
| 112 | welder support plate |
| 114 | linear actuator assembly |
| 116 | vertical actuator rod |
| 118 | holding pad |
| 120, 122 | linear actuator assembly |
| 124, 126 | ultrasonic welding units |
| 128, 130 | probes to contact 62 |
| 140 | frame member |
| 142 | frame member |
| 144 | radially extended support plate |
| 146 | linear actuator assembly |
| 148 | holding pad |
| 150, 152 | linear actuator assembly |
| 154, 156 | gripping and severing tool |
| 158 | nest plate |
| 160 | positioning pins |
| 162 | frame rod |
| 164 | flat in end of 162 |
| 166 | gripper |
| 168 | plate-like body of 166 |
| 170, 172 | tines |
| 174 | slot between 170, 172 |
| 176, 178 | narrow lead-in portions |
| 180, 182 | radiused corners |
| 184, 186 | wider engagement portions |

-continued

| Parts List | |
|---|---|
| 188 | cutter |
| 190 | angled edge |
| 192 | tip of 188 |
| 194 | keeper plate |
| 196 | screws |
| 198 | vacuum receiver or bowl |
| 200 | open mouth of 198 |
| 202 | vacuum conduit |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for closing a camera body of a type including a housing for internal camera components, the housing including a cover part and another part; and a plurality of fastener pairs extending between said parts, each fastener pair including a hook and a catch including an opening for engaging a tip of the hook, said apparatus comprising:

a frame;

a gripper supported by said frame, said gripper having a pair of tines separated by a slot for receiving the tip of the hook, a least one of said tines being configured to engage an edge of the opening during insertion of said gripper into the opening, whereby said at least one tine is caused to flex into contact with the tip of the hook to grip the tip between said tines; and a cutter supported by said frame, said cutter having a cutting edge extended across said slot for severing the tip from the hook.

2. Apparatus according to claim 1, further comprising:

a nest for holding a camera comprising the housing; and means for moving said frame to engage said gripper with the tip of the hook and to force said cutter to sever the tip.

3. Apparatus according to claim 1, wherein upon withdrawal of said gripper from the opening after said severing, said tine flexes out of contact with the severed tip, further comprising:

means for collecting the severed tip.

4. Apparatus according to claim 3, wherein the means for collecting comprises a vacuum receiver.

5. Apparatus according to claim 1, wherein said gripper and cutter are fixedly supported by said frame.

6. Apparatus according to claim 1, further comprising:

a nest for holding a camera comprising the housing;

means for welding the hook to the catch adjacent the tip;

means for moving said nest from a first position in which the hook can be engaged by said means for welding, to a second position in which the tip can be engaged by said gripper and the tip can be severed by said cutter.

7. Apparatus according to claim 1, wherein both of said tines are configured to engage an edge of the opening during insertion of said gripper into the opening, whereby both of said tines are caused to flex into contact with the tip of the hook to grip the tip between said tines.

8. A method for closing a camera body of a type including a housing for internal camera components, the housing including a cover part and another part; and a plurality of fastener pairs extending between said parts, each fastener pair including a hook and a catch including an opening for engaging a tip of said hook, said method comprising steps of:

closing the cover part and the other part to form the housing, whereby the tips of the hooks engage the openings of the catches;

welding the hooks to the catches; and severing the tips from the hooks.

9. A method according to claim 8, further comprising steps of:

gripping the tips prior to said severing step; and withdrawing the tips from the opening of the catches.

10. A method according to claim 8, further comprising a step of:

prior to said welding and severing steps, testing the camera; and omitting said welding and severing steps for cameras which fail to meet predetermined standards during said testing.

* * * * *